United States Patent
Stirling

(10) Patent No.: US 11,993,532 B2
(45) Date of Patent: May 28, 2024

(54) ENHANCED PARTICLE DEPOSITION SYSTEM AND METHOD

(71) Applicant: ASI/Silica Machinery, LLC, Los Angeles, CA (US)

(72) Inventor: David McDonald Stirling, Victoria (AU)

(73) Assignee: ASI/SILICA MACHINERY, LLC, Los Angeles, CA (US)

( * ) Notice: Subject to any disclaimer, the term of this patent is extended or adjusted under 35 U.S.C. 154(b) by 0 days.

(21) Appl. No.: 16/577,045

(22) Filed: Sep. 20, 2019

(65) Prior Publication Data

US 2020/0255322 A1  Aug. 13, 2020

Related U.S. Application Data

(63) Continuation of application No. 14/595,871, filed on Jan. 13, 2015, now Pat. No. 10,464,838.

(51) Int. Cl.
*C03B 37/014* (2006.01)

(52) U.S. Cl.
CPC .... *C03B 37/01486* (2013.01); *C03B 37/0142* (2013.01); *C03B 2207/52* (2013.01); *C03B 2207/66* (2013.01); *C03B 2207/70* (2013.01)

(58) Field of Classification Search
None
See application file for complete search history.

(56) References Cited

U.S. PATENT DOCUMENTS

| | | | | |
|---|---|---|---|---|
| 4,378,985 A | * | 4/1983 | Powers | C03B 37/014 65/415 |
| 4,388,094 A | * | 6/1983 | Carpenter | C03B 19/1492 65/416 |

(Continued)

FOREIGN PATENT DOCUMENTS

| | | |
|---|---|---|
| CN | 1392866 A | 1/2003 |
| CN | 102325730 | 1/2012 |

(Continued)

OTHER PUBLICATIONS

Office Action Issued in Corresponding Chinese Patent Application No. 201680005449.4, dated Nov. 18, 2020.

(Continued)

*Primary Examiner* — Jodi C Franklin
(74) *Attorney, Agent, or Firm* — Norton Rose Fulbright US LLP

(57) ABSTRACT

A deposition system for depositing a chemical vapor onto a workpiece is disclosed, including a deposition chamber having a plurality of components for performing chemical vapor deposition on the workpiece. The workpiece is held by a lathe that rotates the workpiece relative to chemical burners that deposit silica soot on the workpiece. The deposition system has a gas panel for regulating the flow of gases and vapors into the deposition chamber, and a computer for controlling operation of the gas panel and the components in the deposition chamber. Multiple sets of chemical burners are disposed longitudinally along the length of the workpiece. Each set of burners is separated from other sets, such that each set of burners deposit silica particles onto generally different portions of a workpiece. The respective portions include an overlap segment in which one or more burners from one burner set will deposit silica (Continued)

particles on the same portion of the workpiece as one or more burners from another set.

13 Claims, 8 Drawing Sheets

(56) References Cited

U.S. PATENT DOCUMENTS

| | | | | |
|---|---|---|---|---|
| 4,486,212 | A * | 12/1984 | Berkey | C03B 37/01473 65/427 |
| 4,568,370 | A * | 2/1986 | Powers | C03B 37/014 65/403 |
| 4,599,098 | A * | 7/1986 | Sarkar | C03B 37/01466 65/421 |
| 4,627,867 | A * | 12/1986 | Tanaka | C03B 37/0142 65/421 |
| 4,636,239 | A * | 1/1987 | Wilson | C03B 23/045 384/100 |
| 4,915,717 | A * | 4/1990 | Watanabe | C03B 37/0142 65/144 |
| 5,116,400 | A * | 5/1992 | Abbott | C03B 37/0142 65/144 |
| 5,211,732 | A * | 5/1993 | Abbott | C03B 37/0142 65/421 |
| 5,735,928 | A * | 4/1998 | Sayce | C03B 19/1423 65/531 |
| 5,894,537 | A | 4/1999 | Berkey et al. | |
| 5,958,102 | A * | 9/1999 | Shimada | C03B 37/0142 65/421 |
| 6,018,605 | A | 1/2000 | Mills et al. | |
| 6,047,564 | A * | 4/2000 | Schaper | C03B 37/01413 65/29.11 |
| 6,053,013 | A | 4/2000 | Oh et al. | |
| 6,215,092 | B1 * | 4/2001 | Goudeau | C03B 37/01291 164/46 |
| 6,366,353 | B1 * | 4/2002 | Brown | C03B 37/014 356/318 |
| 6,546,759 | B1 * | 4/2003 | Tobisaka | C03B 37/0142 65/531 |
| 6,748,769 | B2 * | 6/2004 | Ooishi | C03B 37/0142 65/421 |
| 6,789,401 | B1 * | 9/2004 | Dabby | C03B 37/01406 65/483 |
| 6,895,783 | B2 * | 5/2005 | Ohishi | C03B 37/0142 65/427 |
| 7,055,345 | B2 * | 6/2006 | Tobisaka | C03B 37/01486 65/421 |
| 7,404,302 | B2 * | 7/2008 | Balakrishnan | C03B 37/01413 65/421 |
| 7,716,951 | B2 * | 5/2010 | Ooishi | C03B 37/0142 65/421 |
| 8,230,701 | B2 * | 7/2012 | Groh | C03B 19/1423 65/421 |
| 8,984,911 | B2 * | 3/2015 | Fabian | C03B 20/00 65/421 |
| 9,522,839 | B2 | 12/2016 | Yoshida | |
| 9,540,272 | B2 | 1/2017 | Bookbinder et al. | |
| 10,464,838 | B2 * | 11/2019 | Stirling | C03B 37/01486 |
| 11,370,691 | B2 * | 6/2022 | Stirling | C03B 37/0142 |
| 2002/0062666 | A1 * | 5/2002 | Ooishi | C03B 37/0142 65/29.11 |
| 2002/0073737 | A1 * | 6/2002 | Ooishi | C03B 37/01493 65/382 |
| 2002/0081377 | A1 * | 6/2002 | Ohishi | C03B 37/0142 427/163.2 |
| 2003/0003228 | A1 * | 1/2003 | Ooishi | C03B 37/0142 65/483 |
| 2003/0024273 | A1 * | 2/2003 | Ishihara | C03B 37/01413 65/382 |
| 2003/0029202 | A1 * | 2/2003 | Ooishi | C03B 37/0142 65/384 |
| 2003/0070450 | A1 * | 4/2003 | Nakamura | C03B 37/0142 65/377 |
| 2003/0101770 | A1 * | 6/2003 | Nakamura | C03B 37/0142 65/421 |
| 2003/0233849 | A1 * | 12/2003 | Shimada | C03B 37/01406 65/382 |
| 2004/0081412 | A1 | 4/2004 | Cocchini et al. | |
| 2004/0244426 | A1 * | 12/2004 | Park | C03B 37/0142 65/421 |
| 2005/0031279 | A1 * | 2/2005 | Ishihara | C03B 37/0142 385/123 |
| 2005/0092030 | A1 * | 5/2005 | Balakrishnan | C03B 37/0142 65/421 |
| 2005/0166641 | A1 * | 8/2005 | Sarkar | C03B 37/0144 65/532 |
| 2005/0199014 | A1 * | 9/2005 | Nakamura | C03B 37/0144 65/413 |
| 2005/0262877 | A1 * | 12/2005 | Balakrishnan | C03B 37/01413 65/421 |
| 2006/0086147 | A1 * | 4/2006 | Ooishi | C03B 37/0142 65/427 |
| 2006/0207295 | A1 | 9/2006 | Huenermann | |
| 2007/0095106 | A1 * | 5/2007 | Yoshida | C03B 37/01486 65/377 |
| 2007/0169514 | A1 * | 7/2007 | Ooishi | C03B 37/0142 65/421 |
| 2007/0240455 | A1 * | 10/2007 | Kang | C03B 37/0144 65/529 |
| 2012/0279259 | A1 * | 11/2012 | Yamada | C03B 37/01413 65/414 |
| 2013/0273248 | A1 * | 10/2013 | Haemmerle | C03B 37/01807 427/237 |
| 2015/0360992 | A1 * | 12/2015 | Yoshida | C03B 37/0142 65/414 |
| 2015/0370026 | A1 | 12/2015 | Hudson, II et al. | |
| 2016/0266343 | A1 * | 9/2016 | Weimann | G02B 6/4482 |
| 2017/0275198 | A1 * | 9/2017 | Takahashi | C03B 9/03 |
| 2018/0050951 | A1 * | 2/2018 | Kashiwagi | C03B 19/1492 |

FOREIGN PATENT DOCUMENTS

| | | | |
|---|---|---|---|
| CN | 103708720 | 4/2014 | |
| JP | S59-078945 | 5/1984 | |
| JP | H03-279234 | 12/1991 | |
| JP | H04-160028 | 6/1992 | |
| JP | H04-260618 | 9/1992 | |
| JP | H06-092670 | 4/1994 | |
| JP | H06-92670 | 4/1994 | |
| JP | 2001-31431 | * 2/2001 | C03B 8/04 |
| JP | 2002-220235 | 8/2002 | |
| JP | 2003048722 | * 2/2003 | C03B 37/01486 |
| JP | 2003-226545 | 8/2003 | |
| JP | 2011-095507 | 5/2011 | |
| KR | 20090092684 | 9/2009 | |

OTHER PUBLICATIONS

Office Action issued by the China National Intellectual Property Administration in corresponding Application No. 201680005449.4 dated Mar. 17, 2020.

Gan, Fuxi et al. "Photonic Glasses and Their Applications", Dec. 31, 2011, pp. 220-221.

Office Action Issued in Japanese Patent Application No. 2020-079942, dated Apr. 6, 2021.

Extended European Search Report issued in European Patent Application No. 16737800.9, dated Jul. 19, 2018.

International Preliminary Report on Patentability issued in Application No. PCT/US2016/013210, dated Jul. 27, 2017.

International Preliminary Report and Written Opinion issued in counterpart Application No. PCT/US2016/013210, dated May 31, 2016.

Office Communication issued in Chinese Patent Application No. 2021105980720, dated Jul. 27, 2017.

* cited by examiner

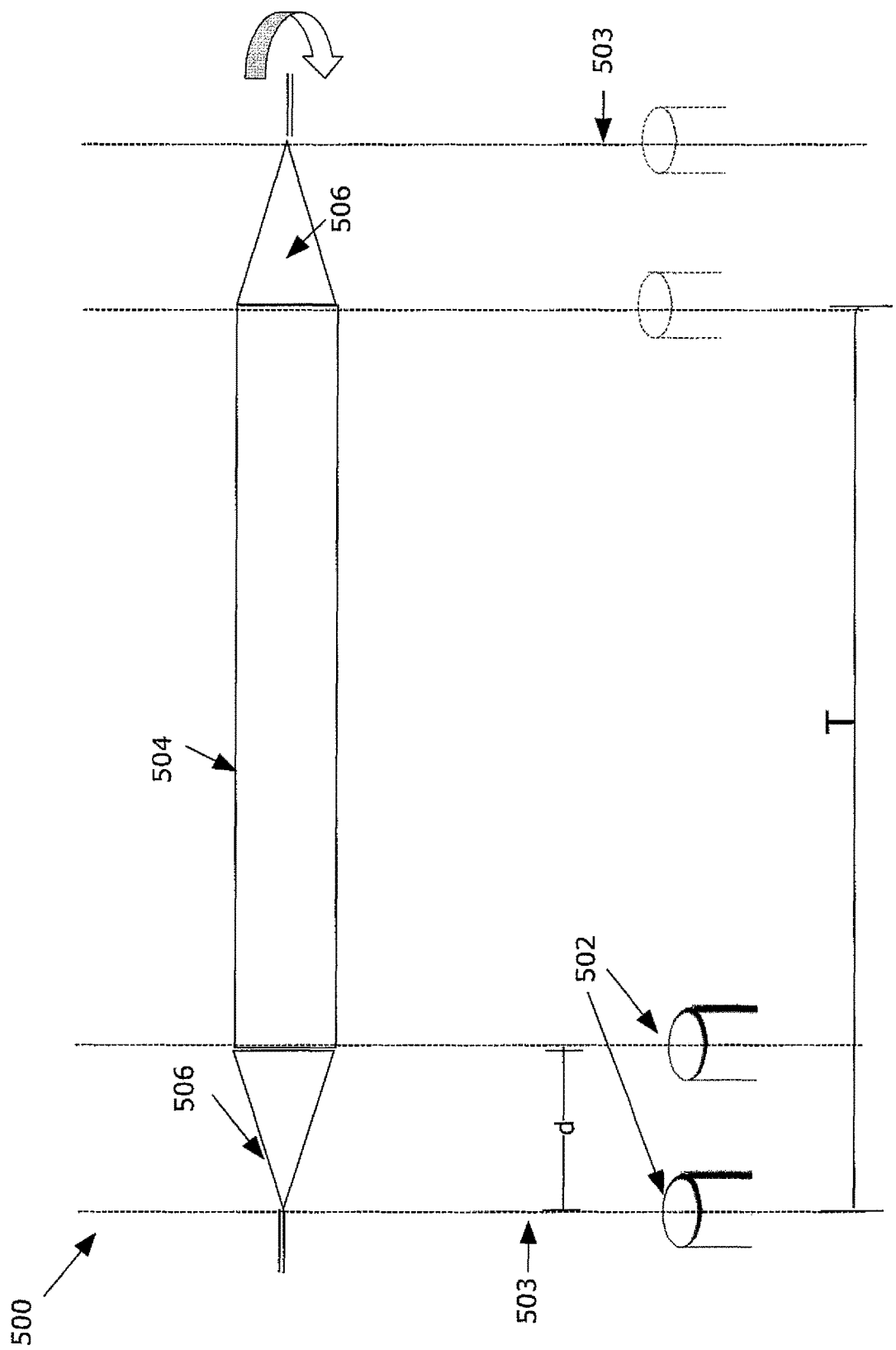

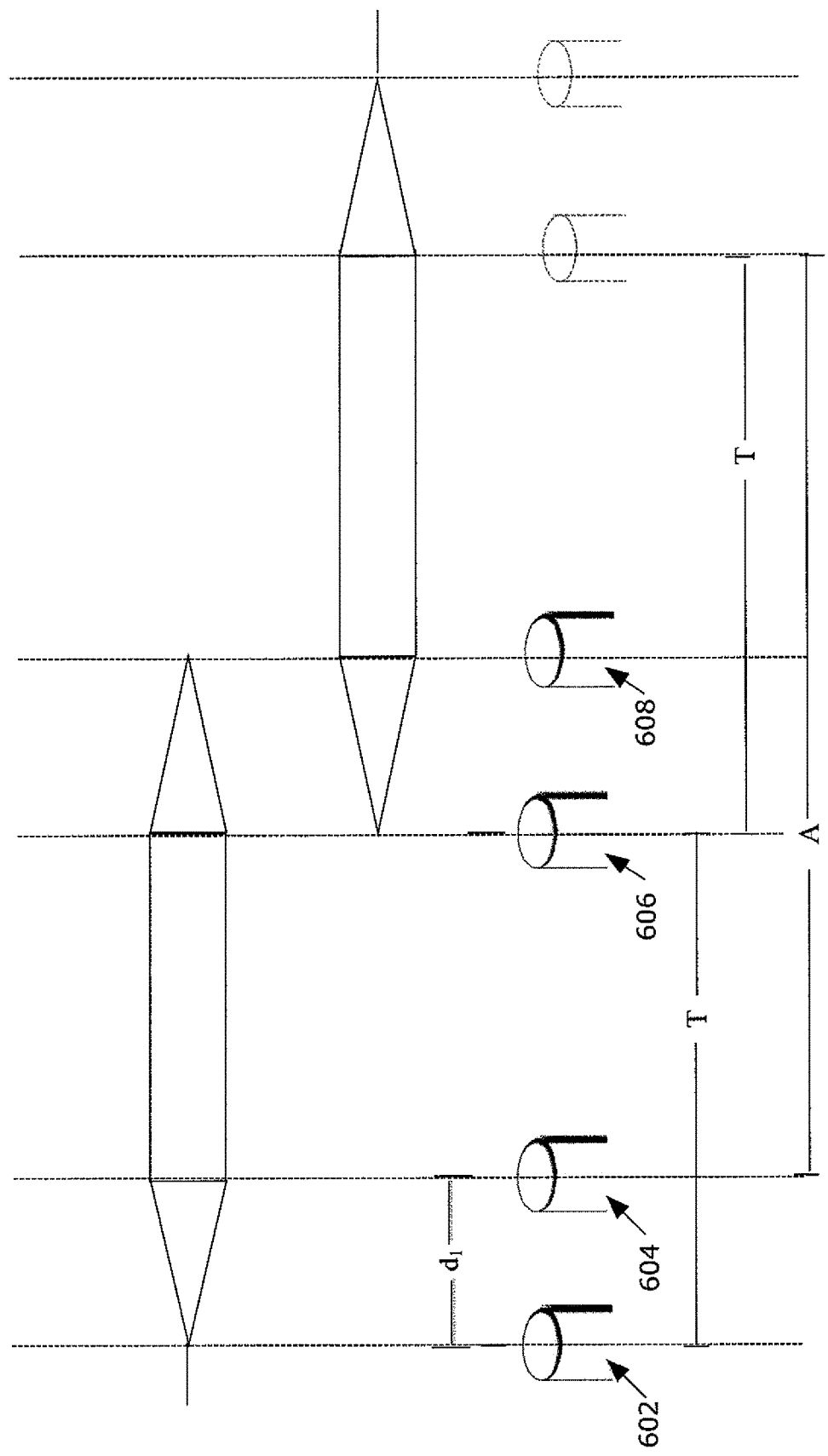

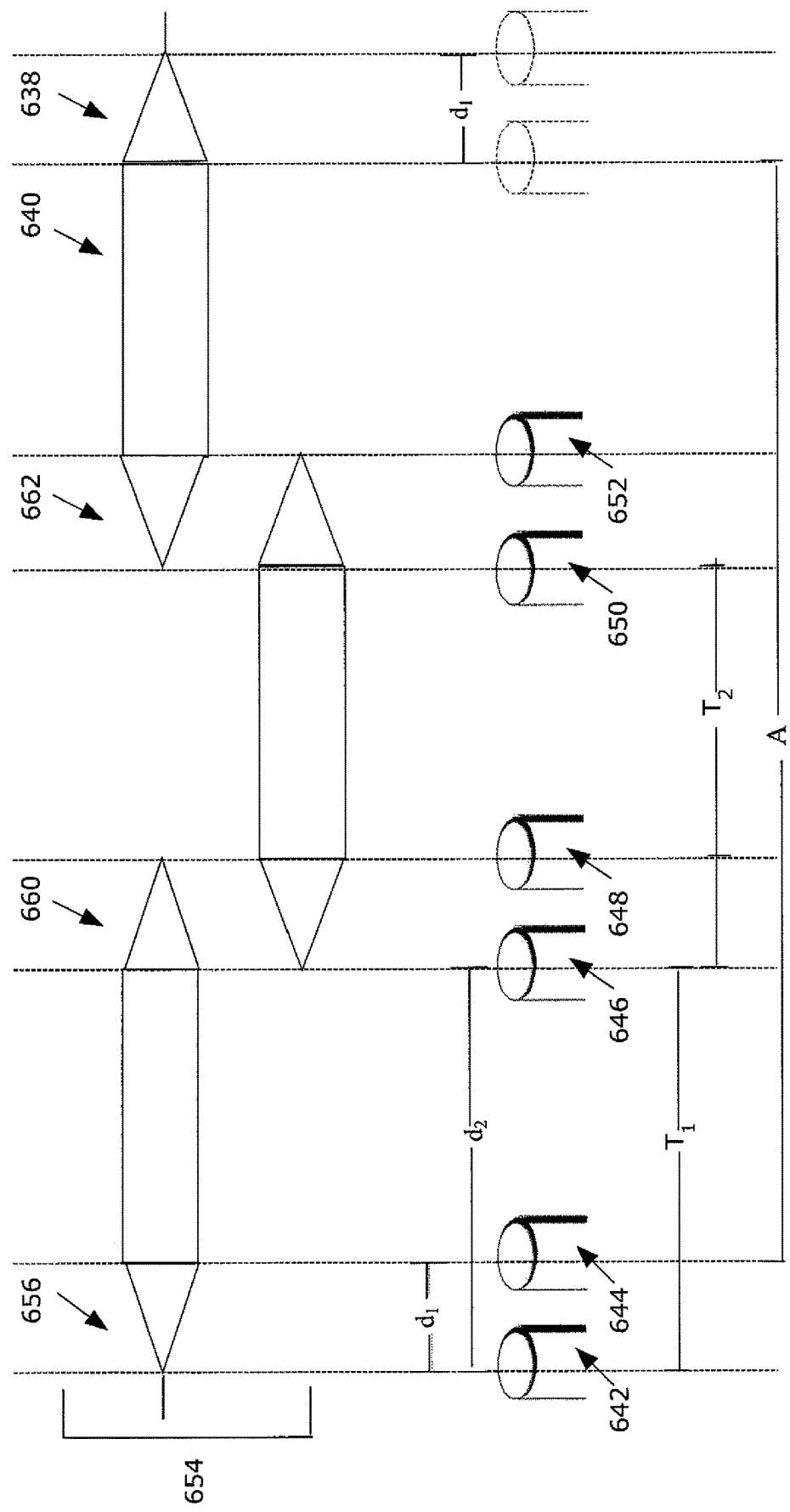
FIG. 6B: New Configuration. Three Sets of Two Burners (Six Total)

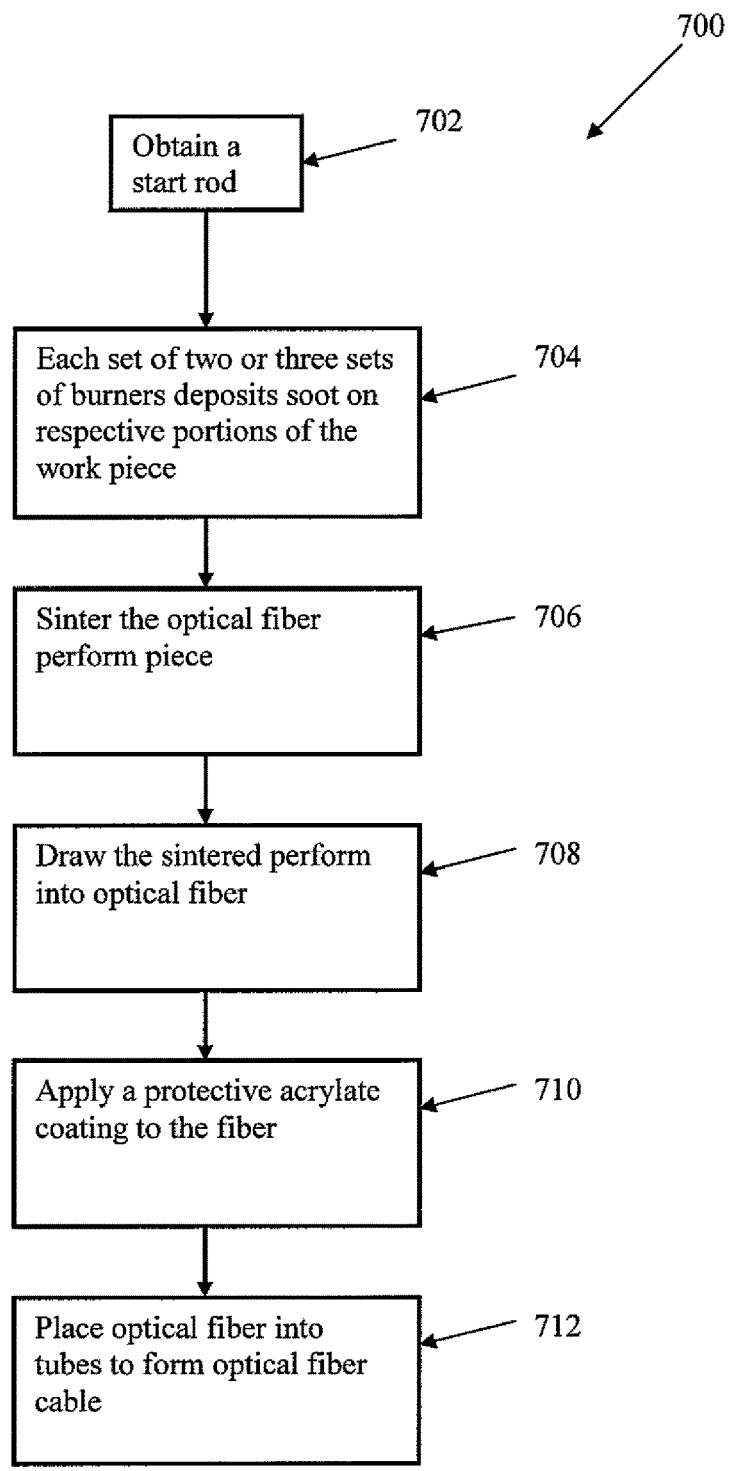
Fig. 7: Method of Optical Fiber Manufacture

ENHANCED PARTICLE DEPOSITION SYSTEM AND METHOD

CROSS REFERENCE TO RELATED APPLICATIONS

This application is a continuation application of U.S. patent application Ser. No. 14/595,871 filed Jan. 13, 2015, of which application is hereby incorporated herein by reference in its entirety.

TECHNOLOGICAL FIELD

The following disclosure relates to systems and methods for depositing chemicals onto workpieces, and the products therefrom. More particularly, systems and methods for depositing silica soot on a start rod for fabricating optical fiber preforms, fused silica rods, and other optical components are disclosed.

BACKGROUND

Today's communications grade optical fiber of fused silica, $SiO_2$, is manufactured according to three basic steps: 1) core preform or "start rod" fabrication, 2) core-with-cladding preform fabrication, and 3) fiber drawing. The core and cladding of a preform correspond in ratios and geometry to those of the ultimate glass fiber that is drawn from the preform.

The first step is to build up a start rod, forming it into a glass that will eventually become the fiber's core, and in some cases, also part of the fiber's cladding layer. The start rod is a glass rod made of silica, $SiO_2$, with the portion of the start rod that comprises the core being doped with a small amount of a dopant, typically Germania, $GeO_2$. The presence of the dopant in the core increases the refractive index of the glass material compared to the surrounding outer (cladding) layer. In the second step, a cladding layer is built up on the start rod. The result of this step is a preform having a core and a cladding, which is conventionally about 160 mm in diameter and about one meter long. The third step is fiber drawing, where the preform is heated and stretched, and typically yields about 400 km of optical fiber.

The primary raw ingredient to fabricating the glass preform is silicon tetrachloride, $SiCl_4$, which generally comes in a liquid form. As noted above, however, $SiO_2$, typically in the form of glass soot, is deposited on the start rod. The chemical reactions involved in the formation of the glass soot are complex, involving, $SiCl_4$, oxygen, $O_2$, and the fuel gas combustion products. In all of the techniques, the silica, $SiO_2$, comprises the cladding of the preform according, generally, to the reaction:

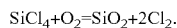

$$SiCl_4+O_2=SiO_2+2Cl_2.$$

Generally, there are four distinct technologies for fabricating core preforms. These technologies include Modified Chemical Vapor Deposition (MCVD), Outside Vapor Deposition (OVD), Vapor Axial Deposition (VAD), and Plasma Chemical Vapor Deposition (PCVD). The resulting product for all of these technologies is generally the same: a "start rod" that is generally on the order of one meter long and 20 mm in diameter. The core is generally about 5 mm in diameter.

Similarly, there are generally four technologies for performing the step of adding the cladding. These technologies include tube sleeving (conceptually paralleling MCVD), OVD soot overcladding (conceptually paralleling OVD), VAD soot overcladding (conceptually paralleling VAD), and plasma (conceptually paralleling PCVD). In this step, additional cladding layers of pure or substantially pure fused silica are deposited on the start rod to make a final preform that can be prepared for fiber drawing.

In MCVD, the step of manufacturing the start rod is performed inside of a tube. Similarly, when the cladding step is performed, a larger tube is sleeved onto and fused to the start rod. Presently, the company, Heraeus, manufactures tubes used for producing start rods and for sleeving onto and fusing with the start rods to make preforms.

In OVD, when fabricating start rods, glass is deposited onto a rotating mandrel in a "soot" deposition process. The start rod is slowly built up by first depositing the germania-doped core, and then the pure silica layers. When the core deposition is completed, typically the mandrel is removed and then the remaining body is sintered into a start rod of glass.

In the process of OVD soot overcladding, where a cladding is deposited onto a fabricated start rod, the start rod is rotating and traversing on a lathe such that many thin layers of soot are deposited on the rod in a stream from a chemical deposition burner over a period of time. Although the $SiO_2$ is not deposited onto the start rod as a vapor, but rather as $SiO_2$ particles, the process is known in the art as a "chemical vapor deposition" process because the $SiCl_4$, which reacts in the stream between the burner and the start rod to form $SiO_2$, is input to the burner as a vapor. The porous preform that results from the OVD soot overcladding process typically is then sintered in a helium atmosphere at about 1500° C., into a solid, bubble-free glass blank. U.S. Pat. No. 4,599,098, issued to Sarkar, which is incorporated by reference as though fully set forth herein, provides further background on systems and techniques for OVD and OVD soot overcladding.

For the above-referenced technologies, typically any one of the core fabrication technologies may be combined with any one of the cladding fabrication technologies to generate a preform that may be used for drawing fiber.

In the OVD soot overcladding processes, one of the key measures of economic viability in comparison to the other available techniques is the deposition rate of the $SiO_2$ on the workpiece. For example, some companies involved in optical fiber manufacturing opt for the most cost-effective method of performing the step of overcladding the start rod in the fiber manufacturing process. With respect to this step in the process, the choice is either to purchase the cladding tubes or to perform a deposition process to add the cladding.

In considering the different approaches, the economics often are reduced to a question of whether a particular vapor deposition system that a company is considering maximizes the deposition rate-to-cost ratio. The deposition rate may be characterized, for example, by the average grams/minute of silica soot that can be deposited on the start rod until completion (i.e., an optical fiber preform ready for sintering). Above a certain average deposition rate, performing the soot overcladding process is likely to be economically more attractive to the company than purchasing cladding tubes. Companies that manufacture systems for performing soot overcladding focus on achieving the highest possible deposition rates and being cost effective, but without compromising the quality of the preform that is produced for fiber drawing.

The factors that determine a deposition system's deposition rate are the chemical vapor delivery rate and the efficiency of chemical vapor deposition onto the workpiece. With respect to vapor delivery, key issues generally revolve around continuously and efficiently maintaining a high (e.g., greater than 200 grams/minute) delivery rate over a prolonged period (e.g., greater than 2 hours). Several methods have been described in the prior art for supplying a hydrolyzing burner with a substantially constant flow of vaporized source material entrained in a carrier gas. For example, in U.S. Pat. No. 4,314,837 issued to Blankenship ("the Blankenship reference"), a system is described that includes several enclosed reservoirs each containing liquid for the reaction product constituent. The liquids are heated to a temperature sufficient to maintain a predetermined vapor pressure within each reservoir. Metering devices are coupled to each reservoir for delivering vapors of the liquids at a controlled flow rate. The respective vapors from each reservoir are then combined before they are delivered to the burner.

With respect to enhancing the deposition efficiency of $SiO_2$ on the workpiece to improve the effective deposition rate, studies have been performed to characterize the flow of chemical vapor from the burners to the surface of the workpiece in the reaction chamber. One reference directed to this issue is Li, Tingye, Fiber Fabrication, pp. 75-77, Optical Fiber Communications, (Academic Press, Inc. 1985). As discussed in the above reference, because of the small size of the formed glass particles, momentum does not cause an impaction of the particles onto the surface of the workpiece. The small sizes of the glass particles would tend to force them to follow the gas stream around instead of at the preform surface. Rather, the phenomenon of thermophoresis is the dominant mechanism for collection on the surface of the preform. As the hot gas stream and glass particles travel around the workpiece, a thermal gradient is established near the surface of the preform. Preferably, the thermal gradient is steep, effectively pulling the glass particles by a thermophoretic force towards the preform.

Various methods have been proposed to increase deposition efficiency based on establishing and maintaining the thermophoretic force. One method is to vary the distance between the burner and the workpiece. See H. C. Tsai, R. Greif and S. Joh, "A Study of Thermophoretic Transport In a Reacting Flow With Application To External Chemical Vapor Deposition Processes," Int. J. Heat Mass Transfer, v. 38, pp. 1901-1910 (1995). Another set of methods, disclosed in U.S. Pat. Nos. 6,789,401, 7,451,623 and 7,451,624 issued to Dabby et al., which are incorporated herein by reference as though fully set forth herein, involves selectively translating the burners relative to the workpiece above various threshold velocities, e.g., greater than 1.4 meters per minute. Higher velocities mean that less heat is applied to any given spot on the workpiece. The workpiece is therefore kept cooler, which tends to increase the thermal gradient. Nevertheless, even applying these methods, demand for even higher deposition rates has gone unmet.

To further increase deposition rate, some have suggested providing an array of numerous soot-depositing burners. These additional burners are proposed to be positioned for example, on a burner block along the longitudinal axis of the lathe, where each burner deposits chemical soot on the workpiece. Specifically, U.S. Pat. No. 6,047,564 issued to Schaper et al., and incorporated herein by reference as though fully set forth herein, discloses a vapor deposition system in which a row of twelve equally-spaced chemical burners is mounted on a burner block, each such burner depositing soot. The burner block moves forward and backward along the longitudinal axis of the workpiece. The amplitude of the motion of the burner block generally corresponds to the distance between the burners such that each burner is deposits soot on a designated segment of the entire workpiece.

Similarly, U.S. Pat. Nos. 5,116,400 and 5,211,732 issued to Abbott et al. and incorporated herein by reference as though fully set forth herein, disclose a deposition system comprising an array of chemical burners. Like in the Schaper et al. patent, the Abbott et al. patents disclose a deposition process in which each burner in the chemical burner array deposits soot on only a portion of the usable length of the preform. The Abbott patents disclose an array of eleven burners preferably equally spaced from each other by about four inches. The burner array is oscillated through a total distance 2J, with a distance J in each direction from the burner array's center position. The Abbott el al. patents disclose that preferably the oscillation amplitude is equal to or slightly greater than the burner spacing d in order to insure uniformity of deposition. Accordingly, each burner traverses approximately 20% of the length of the preform. In discussing varying the number of burners and their spacing to improve deposition efficiency, the Abbott et al. patents disclose that for its configuration, deposition efficiency should improve as the number of burners is increased.

Such multiple burner configurations as disclosed in the Schaper et al. and Abbott et al. patents are not commercially attractive in part because anticipated improvements in deposition rate have not been realized. The close proximity of the chemical burners to each other compromises the thermophoretic effect such that the deposition efficiency significantly reduced. The close proximity of chemical burners positioned over the length of a workpiece prevents regions of the workpiece from having sufficient time to cool before another burner is delivering soot on that same region. Furthermore, the amount of heat and number of chemical streams generated in the chamber caused by having a large number of burners depositing soot compromises the desired laminar flow around the workpiece, which thereby reduces the needed thermal gradient for thermophoresis to occur. Without the optimal temperature gradient between a burner and the workpiece, thermophoresis is weakened, which reduces the deposition efficiency, and thereby, the overall deposition rate.

The costs associated with such multiple burner configurations are also prohibitive. These costs include not only the costs associated with the additional chemical burners, but the costs of the vaporizers, preheaters and other equipment needed to support them, as well as the scrubbers and other equipment needed to handle the additional wasted deposition material and heat that the burners produce. Furthermore, because these burner configurations require vast amounts of chemical to achieve acceptable deposition rates, the cost of the chemical needed to manufacture each preform is increased. These multiple-burner configurations can therefore be fairly characterized as "brute force" approaches that are unduly wasteful of material and unnecessarily expensive.

As a result, a need exists for systems and methods that offer further improvements to deposition efficiency, chemical delivery and, thereby, the overall deposition rate of chemical vapor. A need further exists for systems and methods that offer cost effective manufacturing of optical fiber preforms, including the manufacture of larger preforms in the same deposition space, and accordingly, cost-effective optical fiber. A need further exists for multiple-burner configurations in chemical vapor deposition systems and processes that maintain the necessary thermophoresis to provide higher deposition rates and efficiencies.

SUMMARY OF THE DISCLOSURE

The following disclosure generally provides, in one aspect, systems and methods for enhancing the effective deposition rate of chemicals onto a workpiece, such as the deposition of $SiO_2$ from a $SiCl_4$ vapor onto a start rod for making a preform usable for drawing into optical fiber.

In a second separate aspect as described herein, systems and methods for manufacturing pure fused silica, optical fiber preforms, silica tubes, optical fiber, and silica rods, including fused silica rods, are disclosed.

In a third separate aspect as described herein, a deposition system for depositing silica particles onto a workpiece includes a first set of burners for depositing silica particles onto a first portion of the workpiece, a second set of burners for depositing silica particles onto a second portion of the workpiece, and a lathe for holding the workpiece and for rotating the workpiece relative to the first and second sets of burners. The first and second portions of the workpiece overlap each other to form an overlap segment. Preferably, the longest distance between deposition burners within any set of two proximate burners is less than the shortest distance between burners in different sets.

In a fourth separate aspect as described herein, a method of manufacturing optical fiber includes the steps of obtaining a start rod, and depositing fused silica on the start rod to produce an optical fiber preform. The depositing step includes steps of depositing silica on a first portion of the start rod using a first pair of burners separated from each other by a distance of about d, and depositing silica on a second portion of the start rod using a second pair of burners separated from each other by a distance of about d. The first and second portions overlap each other and the overlap preferably has a width of about d. Furthermore, the first pair and second pair of burners are preferably separated by a distance T, where T is preferably greater than three times d.

In a fifth separate aspect as described herein, a deposition system for depositing silica particles onto a workpiece includes a first set of burners for depositing silica particles onto a first portion of the workpiece, a second set of burners for depositing silica particles onto a second portion of the workpiece, a third set of burners for depositing silica particles onto a third portion of the workpiece, and a lathe for holding the workpiece and for rotating the workpiece relative to the first, second and third sets of burners. The first and second portions of the workpiece preferably overlap each other to form a first overlap segment onto which one burner from the first set burners and a second burner from the second set of burners substantially deposits silica particles. Similarly, the second and third portions of the workpiece preferably overlap each other to form a second overlap segment onto which one burner from each of the second set and third set of burners substantially deposits silica particles. In this configuration, the furthest distance between deposition burners within any set of burners is less than the shortest distance between burners in different sets.

In a sixth separate aspect as described herein, a method of manufacturing optical fiber includes the steps of obtaining a start rod, and depositing fused silica on the start rod to produce an optical fiber preform. The depositing step preferably includes the steps of depositing silica on first, second and third portions of the start rod using first, second and third pairs of burners, respectively. The burners in each pair are preferably separated from each other by a distance of about d, where d is preferably greater than about 80 mm. The first and second portions of the start rod overlap each other and the overlap has a width of about d, and the second and third portions overlap each other and that overlap also has a width of about d. In this configuration, the shortest distance between a burner of the first pair of burners and a burner of the second pair burners is greater than d, and the shortest distance between a burner of the second pair of burners and a burner of the third pair burners is also greater than d.

Further embodiments as well as modifications, variations and enhancements are also described herein.

BRIEF DESCRIPTION OF THE DRAWINGS

FIG. 5 depicts a conventional configuration 500 of chemical burners relative to a workpiece;

FIG. 6A depicts a preferred embodiment of a multiple-burner configuration 600 in a chemical vapor deposition process;

FIG. 6B depicts another preferred embodiment of a multiple-burner configuration 600 in a chemical vapor deposition process; and FIG. 7 is a process flow diagram illustrating a preferred embodiment of a process of performing chemical vapor deposition such as may be performed by the chemical vapor deposition system illustrated in FIG. 1.

DETAILED DESCRIPTION OF PREFERRED EMBODIMENTS

Figure 1:
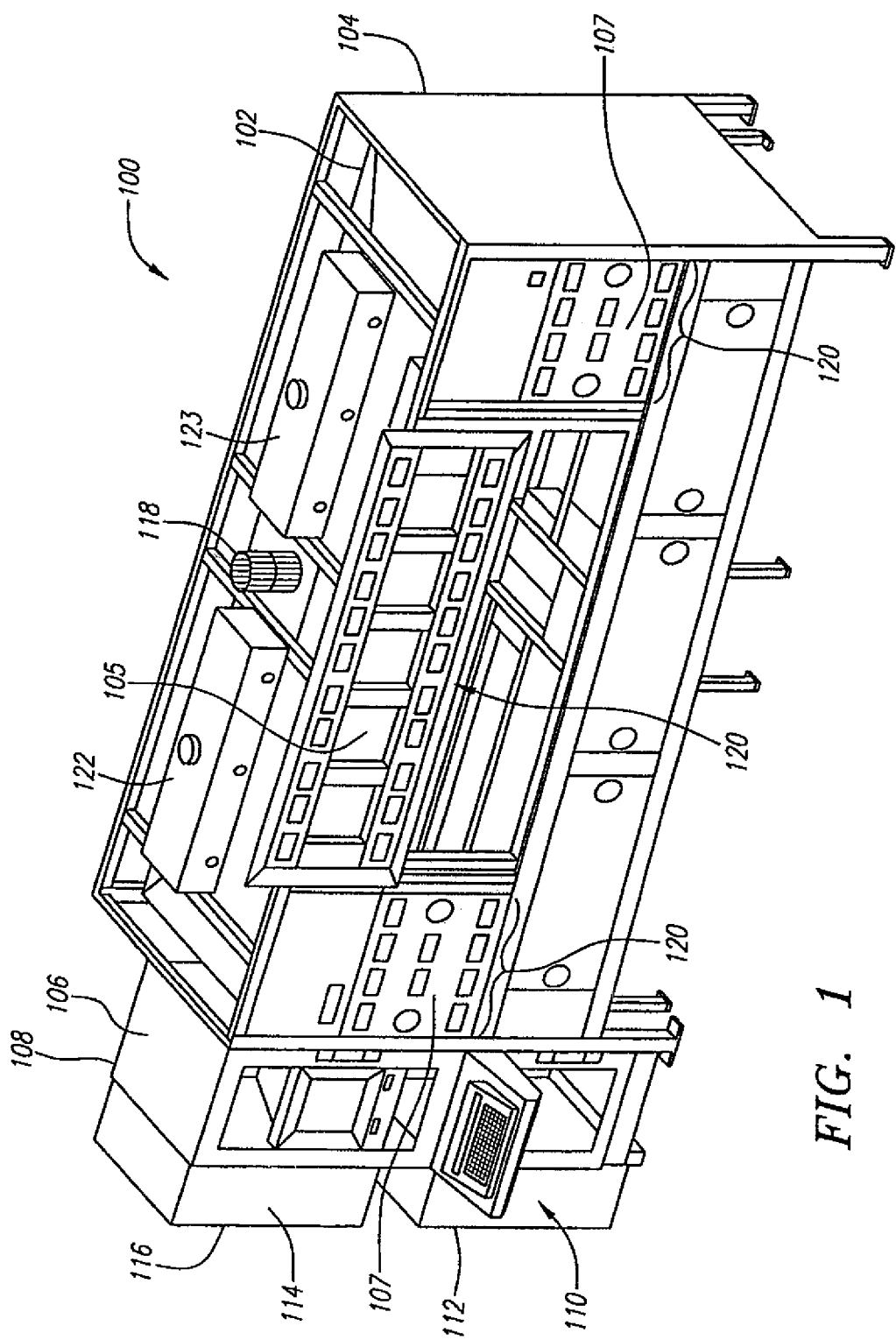
FIG. 1 is a schematic diagram of a perspective view of a preferred embodiment of a chemical vapor deposition system.

FIG. 1 depicts a preferred embodiment of a chemical vapor deposition system 100, usable in the manufacture of optical fiber preforms, optical fiber, pure fused silica, fused silica tubes, core preforms, silica wafers, silica substrates and silica ingots. The chemical vapor deposition system 100 preferably includes a reaction or deposition chamber 102, and an enclosure 104 for the deposition chamber 102, a computer 106 and other electronic components, an enclosure 108 for the computer 106 and the other electronic components, a power distribution subsystem 110, an enclosure 112 for the power distribution subsystem 110, a gas panel 114, a gas panel enclosure 116 and an intake and exhaust subsystem, including a main exhaust 118 and secondary exhausts 122, 123.

The deposition chamber 102 is structured to house a process of deposition of particles (e.g., particles of silica soot) onto a workpiece or start rod. The deposition chamber 102 and the deposition system 100 generally may be used to produce an optical fiber preform that, in a subsequent drawing process, may be used to manufacture optical fiber. The deposition system 100 may also be used to manufacture fused silica rods, including pure fused silica rods. For this application, the deposition system 100 generally applies silica soot to an initial start rod of substantially pure fused silica. The product of this deposition process, a pure fused silica preform, is then sintered to form the pure fused silica rod and may be used to manufacture (e.g., by drawing, slicing or otherwise reforming the pure fused silica rod)

silica wafers or substrates, multi-mode optical fiber, and other optical components for a variety of applications.

The other subsystems and components of the deposition chamber 102 are generally provided to support the deposition process. In one embodiment, deposition material generally comprising a vapor of silicon tetrachloride (SiCl4) and oxygen (O2) is emitted from a chemical burner in a process of fabricating optical fiber preforms in a deposition region 146 of the deposition chamber 102. In the deposition region 146 are the chemical burner, a chemical stream from the burner, and the workpiece, where the stream is directed towards the workpiece from the burner. The burner also preferably issues and ignites streams of hydrogen and oxygen. The resulting flame heats the chemical constituents to temperatures generally exceeding about 1000° C. A chemical reaction with the hydrogen, oxygen and SiCl4 occurs in the stream, in which the SiCl4 in the stream is oxidized producing particles of silicon dioxide (that are then deposited on the workpiece) and a byproduct of hydrogen chloride (HCl). Optionally, methane may be used to generate the heat necessary in the deposition chamber 102, and octamethyl silica and silane (octomethycyclotetrasiloxane) for a source of silicon to produce silicon dioxide.

The deposition chamber 102 preferably provides a laminar flow of air in the deposition region around the workpiece. The provided laminar flow preferably assists in maintaining a focused stream of heat and chemical vapor from the burner towards the workpiece. A narrow and tight stream of flame enhances the thermophoretic effect that attracts the $SiO_2$ particles to the workpiece because the $SiO_2$ particles get hotter while the surface of the workpiece remains relatively cooler.

Large quantities of oxygen ($O_2$) and fuel gas, typically in the form of hydrogen ($H_2$) or natural gas, are passed through the deposition chamber 102 to enable the deposition process of converting $SiCl_4$ into $SiO_2$ soot that is deposited in layers onto a workpiece.

Figure 2:
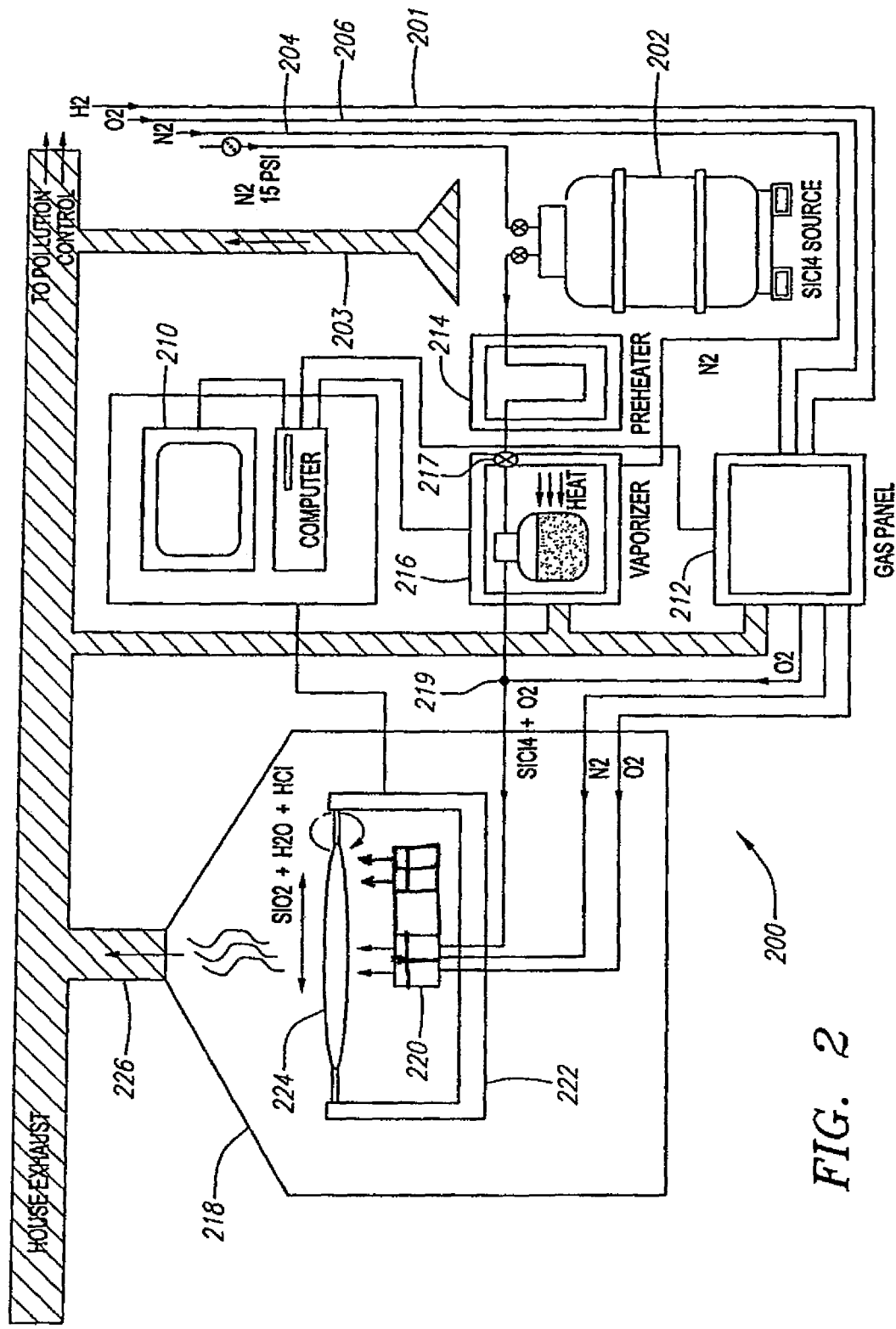
FIG. 2 is a function-oriented diagram of a preferred embodiment of a chemical vapor deposition system.

FIG. 2 is a diagram depicting a functional view of the chemical vapor deposition system 100 generally shown in FIG. 1. As depicted in FIG. 2, the chemical vapor deposition system 200 preferably includes a $SiCl_4$ source 202, a nitrogen (N2) source 204, an oxygen ($O_2$) source 206, and an $H_2$ source 208 as raw materials for the vapor deposition system 200. Alternatively, the $N_2$, $O_2$, and $H_2$ sources 204, 206, 208 may be piped in from an external location. The deposition system 200 preferably further includes a computer 210, a gas panel 212, a preheater 214, and a vaporizer 216 for controlling the flow of the materials used for the deposition process.

The deposition system 200 preferably includes a deposition chamber or cabinet 218, enclosing preferably four or more chemical deposition burners 220, a lathe 222 for holding a workpiece 224 and for moving the workpiece 224 rotationally and, optionally, translationally relative to the four or more chemical burners 220. The deposition chamber 218 preferably encloses one or more end-torches (not shown) positioned near the ends of the workpiece 224, and which preferably move (or remain stationary) with the workpiece 224. The end torches preferably direct heat to the ends of the workpiece 224 to prevent it 224 from breaking and/or cracking. Preferably, the workpiece 224 and the end torches move so that the exhaust around the chemical burner 220 is maintained relatively constant. Alternatively, the chemical burners 220 are moving and the workpiece 224 and end torches are stationary (except for the rotation of the workpiece 224). The deposition system 200 preferably further includes an air intake and exhaust subsystem 226 including scrubbers (not shown).

The computer 210 preferably includes electronic connections to the vaporizer 216, the gas panel 212, and the deposition cabinet 218 for automatically controlling functions of each component. The computer 106, 210 preferably further includes a connection to a user-input device such as a keyboard, touch screen, knobs, buttons, switches, mouse and/or microphone for voice activated command input for providing operational control of the deposition system 200 to a user. Moreover, the computer 210 preferably includes a user output device, such as a display monitor or speaker for presenting a status of the system.

The raw deposition materials' sources 202, 204, 206, 208 are preferably reservoirs, which may be commercially available pressurized tanks for containing each constituent material. The $SiCl_4$ preferably is contained in a reservoir in liquid form, preferably at room temperature. The SiCl4 source 202 preferably is connected by a pipe or line to the preheater 214, such that SiCl4 may be conveyed as a liquid into the preheater 214. Preferably, positioned above the $SiCl_4$ source 202 is an exhaust port 203 to convey $SiCl_4$ to a pollution control system (not shown) in event of a leak of $SiCl_4$ from its source 202. The preheater 214 is connected to the vaporizer 216 for transferring the heated SiCl4 liquid out of the preheater 214 and into the vaporizer 216.

The vaporizer 216 comprises a container for containing a substantial volume of $SiCl_4$, a heating element to heat the $SiCl_4$ in the container, and numerous valves (not shown) to regulate the flow of materials into and out of the vaporizer 216. The vaporizer 216 is preferably electronically connected to the computer 210. Through this electronic connection, the volume of $SiCl_4$ in the vaporizer 216 is preferably regulated and maintained between a predetermined minimum and maximum level. The computer 210 preferably controls the flow of $SiCl_4$ liquid from the $SiCl_4$ source 202 to the vaporizer 216 from a solenoid valve 217. The vaporizer 216 is also preferably pneumatically connected by a line to the $N_2$ source 204. Through control from the computer 210, the $SiCl_4$ source 202, the preheater 214 and the vaporizer 216 preferably provide a constant, automatic and prolonged flow of vaporized $SiCl_4$ from the vaporizer 216 to the burners 220 in the deposition cabinet 218.

The gas sources 204, 206, 208 are preferably pneumatically connected to the gas panel 212. The gas panel 212 includes valves and mass flow controllers to regulate the flow of gasses from the gas sources 204, 206, 208. Control of the valves in the gas panel 212 is provided by the computer 210, which is electronically connected to the gas panel 212. Lines for $O_2$ and $H_2$ are provided to preferably pneumatically connect the gas panel 212 and the burner 220 in the deposition cabinet 218. Further, a separate line is preferably provided to convey $O_2$ to the line carrying the vaporized $SiCl_4$ to the burner 220. Thus, at a "T" fitting 219, the vaporized $SiCl_4$ and $O_2$ are mixed, and continue as a mixture in their transport to the burners 220.

Accordingly, four separate lines are preferably input to the burners 220: a line conveying a mixture of vaporized $SiCl_4$ and $O_2$, a line conveying $H_2$ or another convenient fuel gas, a line conveying O2 for the combustion of hydrogen, and a line conveying $O_2$ to shield the $SiCl_4$ and $O_2$ mixture. This configuration preferably assures at least close to the same volume of $SiO_2$ particles from each of the four chemical burners 220 at any given point in time.

Figure 3:
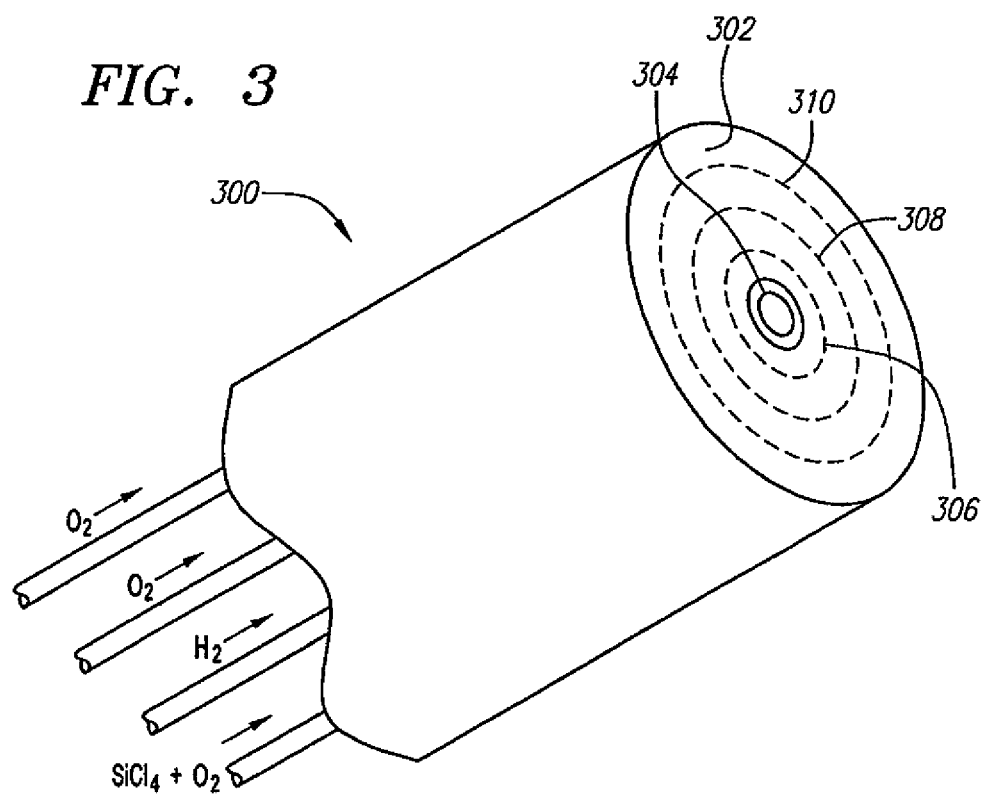
FIG. 3 is a diagram of a functional representation of a chemical burner.

FIG. 3 depicts a preferred embodiment of a burner 300 for use in the deposition system. The burner 300 preferably receives the four streams (one for each input line), and emits preferably four streams from a burner face 302, each stream being emitted from one of at least four concentric rings 304, 306, 308, 310 of emission holes.

As the constituents are emitted from the burner 300, the fuel gas and the oxygen are ignited. The $SiCl_4$ particles react in the flame at a controlled distance away from the face of the burner 300. The $SiCl_4$ particles passing through the flame are oxidized to form silica soot that continue in a directed stream toward a workpiece 224 that may initially be in the form or a start rod. As silica soot approaches the workpiece 224, the silica soot has a temperature on the order of about 1100° C. The chlorine is preferably separated from the other materials and combines with hydrogen to ultimately form hydrochloric fumes (HCl). These reactions generally apply to the deposition process for a cladding on an optical fiber preform. Other constituents may be used for chemical vapor deposition for other applications applying the different embodiments and aspects of the chemical vapor deposition system described herein.

Figure 4:
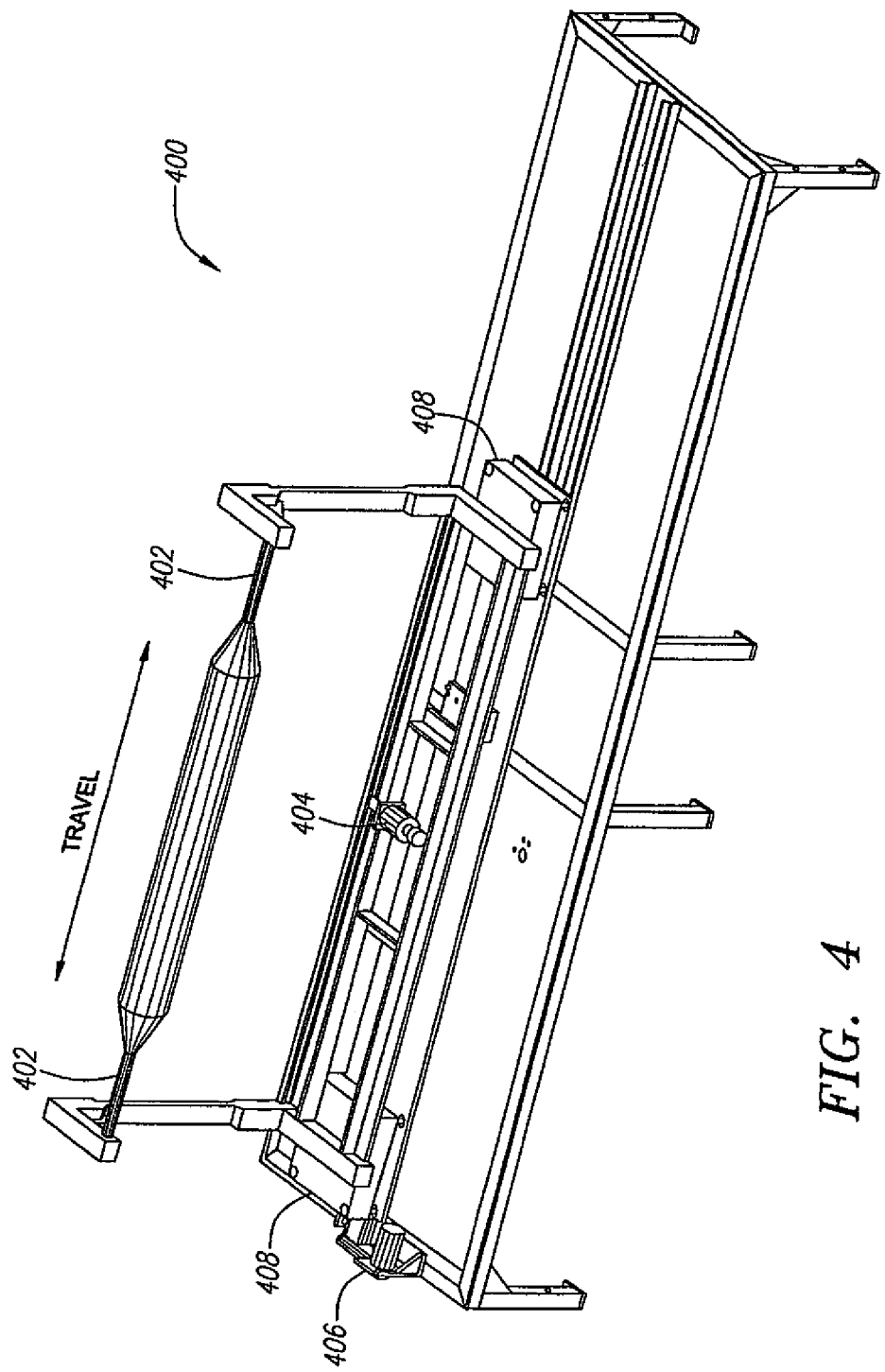
FIG. 4 is a schematic diagram providing a perspective view of a preferred embodiment of a lathe, such as is generally depicted in FIG. 2, for holding and moving a workpiece in a chemical vapor deposition system as is depicted in FIGS. 1 and 2.

Referring again to FIG. 2, the silica soot is deposited in layers on a continuously moving workpiece 224. The workpiece 224 is mounted on the lathe 222, which preferably rotates and translates the workpiece 224 relative to the burners 220. As shown in FIG. 4, the lathe 400 preferably includes end holders 402 into which the ends of the workpiece 224 (e.g., the start rod) are inserted. The lathe 400 further includes at least one and optionally two motors 404 and 406 for moving the workpiece 224 relative to the burners 220 both rotationally, and optionally, translationally. The motors 404, 406 are preferably controlled by a computer 210, such as that depicted in FIG. 2, for controlling the speed of rotation and translation of the workpiece 224 throughout the course of the deposition process on the workpiece 224.

In the deposition process, the translation speed of the workpiece 224 relative to the burner may alternate (e.g., velocity to the right versus to the left) between slow (e.g., 1 meter per minute) and fast (e.g., more than five meters per minute). The fast pass may be performed so that the deposition at the end of a slow pass (e.g., at the left end portion of the workpiece), effectively resumes with a slow pass that commences at the right end-portion of the workpiece. Such a motion profile may be advantageous because at the conclusion of a slow pass to the left, the thermophoretic force will be strongest where the workpiece is the coolest, which, in this example, would be at the right end, which has been afforded the most time to cool. A very fast pass (e.g., greater than 20 meters per minute) may be employed primarily for the purpose of quickly positioning the burners for another slow pass that starts at the coolest point on the workpiece. This approach also helps to minimize the "footballing" effect that is discussed in the Dabby et al. patents referenced herein.

FIG. 5 depicts a conventional configuration 500 of chemical burners relative to a workpiece onto which silica soot is deposited. Two burners 502 are separated by a distance d and traverse a longitudinal path relative to a workpiece 504. The configuration also preferably includes torches (not shown) that heat and solidify the ends of workpiece to prevent it from bending or cracking. The torches are distinguished from the burners, in that the torches do not typically deposit soot on the workpiece. In the deposition process, the pair of burners 502 traverses a distance T along the longitudinal length of the workpiece 504, while the workpiece is rotating on a lathe. The pair of burners 502 reaches the endpoint 503 of a traversal in one direction. Then, the pair of burners 502 returns along the essentially same longitudinal path in the opposite direction. Over the course of a deposition process, the endpoint 503 may vary slightly from pass to pass, to avoid producing a rippling effect on the surface of the preform. At the endpoints 503 of the traversal, a portion of the workpiece having a width of approximately d, where d is the distance between the chemical burners 502, receives deposition from one of the two burners 502 in the pair, but not both burners 502. As a result of having only one burner deposit soot onto the ends of the workpiece, any tapering of the workpiece at its endpoints may be amplified, as depicted by the tapered regions 506.

A configuration of two burners in relatively close proximity is suitable from the standpoint of thermophoresis because two burners so configured typically will not deposit on the same region of the workpiece. During the deposition process, because the workpiece is continuously rotating, the second burner in a pair will typically deposit on the radial side of the workpiece that opposes the side on which the first burner in the pair has deposited. Once a third close-proximity burner is added to the burner configuration, thermophoresis is impacted because the third burner will typically generally deposit on the same region on which the first burner deposited soot. Because of the third burner's close proximity to the other two burners, that region of the preform has not yet had sufficient time to cool for thermophoresis to adequately take place.

FIG. 6A depicts a multiple-burner configuration 600 in a chemical vapor deposition process that overcomes the prior art's shortcomings of a weakened thermophoretic force as a result of using three or more burners in close proximity to each other while providing an enhanced deposition rate through the use of additional burners. In the new multiple-burner configuration, thermophoresis is not materially compromised, leading to enhanced deposition efficiency and greatly enhanced deposition rate, as well as a practical use of deposition material. FIG. 6A depicts a first set of chemical burners 602 and 604 and a second set of chemical burners 606 and 608. The burners in each set are preferably spaced from each other by a distance d1 (e.g., 80 mm-150 mm), and d1 is preferably the same for both sets of chemical burners. The mean distance between sets of burners is T, where T preferably is a distance (e.g., 40 cm) sufficient for thermophoresis to take place when one pair of burners deposits on a region of the preform following a deposition on that region by the other pair of burners. To establish a consistent thermophoretic force, the distance between pairs of burners must be above a certain threshold so that enough time elapses between depositions by the different pairs of burners. Preferably, the distance, T, between pairs of burners is generally greater than (e.g., three times) $d_1$. In this configuration, the distance T is also approximately equal to the distance that the burners 602, 604, 606, 608 traverse longitudinally in each direction. The value of T represents only a portion of the length, L, of the workpiece 610, such that each of the two sets of burners is responsible for depositing on approximately half of the workpiece 610. In the middle of the workpiece 610, both sets of burners responsible for an overlap segment 612, with each set of burners contributing to the deposition generally in accordance with the triangles shown in FIG. 6A. In this multiple-burner configuration, L is generally equal to about 2T+d. In FIG. 6A, each portion of the workpiece 610 for which a set of burners is responsible is shown, purely for clarity of explanation, separately. Of course, in practice the two portions form one continuous workpiece 610.

In the deposition process, the chemical burners generally remain fixed distances from each other while they traverse the workpiece 610. For example, while chemical burners 602 and 604 traverse to the right along the left side of the workpiece 610, chemical burners 606 and 608 traverse to the right along the right half of the workpiece 610. Similarly, while chemical burners 602 and 604 traverse to the left along the left side of the workpiece 610, chemical burners 606 and 608 traverse to the left along the right half of the workpiece 610. In this manner, each set of burners do not interfere with the other set as they deposit soot on the portion of the workpiece 610 for which each is responsible.

In the burner configuration depicted in FIG. 6A, each of the four chemical burners 602, 604, 606, 608 preferably streams about the same amount of silica soot at any given point in time. Indeed, both sets of burners preferably receive chemical from the same supply, so as to help insure that both sets of burners stream the same volume of silica soot at any given time. At any given point on the workpiece 610, generally two burners are capable of depositing silica soot on the workpiece 610, except at the ends of the workpiece 610, where at the left end-portion, only the leftmost burner 602 will deposit silica soot, and at the right end-portion, where only the rightmost burner 608 will deposit soot. However, between the end-portions, two burners deposit silica soot on the workpiece 610. At the interface of the deposition between the two sets of burners, burner 604 of the left burner set and burner 606 of the right burner set deposit silica soot, so that even at the interface, two burners are depositing silica soot on the workpiece. Such a deposition enables the creation of a preform with generally a seamless transition between the portions of the preform formed by the depositions from each respective set of chemical burners. The result of this process is the formation of a preform with a fully usable portion, A, as depicted in FIG. 6A between the end-portions of the workpiece 610.

FIG. 6B depicts another multiple burner configuration 640 that overcomes the prior art's shortcomings of a weakened thermophoretic force when using multiple burners. In this alternative multiple-burner configuration, thermophoresis is not compromised, which accordingly provides enhanced deposition efficiency. FIG. 6B depicts a set of chemical burners 642 and 644, a second set of chemical burners 646 and 648, and a third set of chemical burners 650 and 652. The burners in each set are preferably spaced from each other by a distance d1 (e.g., 80 mm-150 mm), and d1 is preferably the same for each set of chemical burners. The mean distance, $T_1$, between the first set of burners and the second set of burners is preferably the same as the mean distance, $T_2$, between the second set of burners and the third set of burners, such that $T_1=T_2$. Also, shortest distance between burners in different sets is longer than the longest distance between deposition burners in the same set. The parameters $T_1$ and $T_2$ are distances (e.g., 30 cm) generally significantly greater than (e.g., 3 times) $d_1$, and $T_1$ and $T_2$ represent only a portion of the length, L, of the workpiece 654 such that preferably L is equal to about $3T_1+d_1$ (or $3T_2+d_1$). As with the previous configuration, the longitudinal distance traveled by the burners in each direction relative to the workpiece is equal to about the mean distance between nearest sets of burners.

In the deposition process, the burners generally remain these fixed distances from each other while traversing the workpiece 654. For example, while chemical burners 642 and 644 traverse to the right along the leftmost portion of the workpiece 654, chemical burners 646 and 648 traverse to the right along a middle portion of the workpiece 654 and chemical burners 650 and 652 traverse to the right along the rightmost portion of the workpiece 654. Similarly, while chemical burners 642 and 644 traverse to the left along the left side of the workpiece 654, chemical burners 646 and 648 traverse to the left along the middle portion of the workpiece 654, and chemical burners 650 and 652 traverse to the left along the rightmost portion of the workpiece 654. In this manner, the three sets of burners do not interfere with each other while depositing on the portion of the workpiece 654 for which each set is responsible.

In this configuration, each of the six chemical burners preferably streams the same amount of silica soot at any given time. Again, as in the previous embodiment, the three sets of burners preferably receive chemical from the same supply. At any particular point on the workpiece 654, generally two burners will deposit silica soot on the workpiece 654, except at the ends of the workpiece 654, where at the left end-portion 656, only the leftmost burner 642 will deposit silica soot, and at the right end-portion 658, the rightmost burner 652 will solely deposit on that portion of the workpiece 654. However, between the end-portions, two burners deposit silica soot on the workpiece. At the interfaces 660, 662 of the deposition between each set of burners, two burners generally will deposit soot. At interface 660, burner 644 of the left burner set and burner 646 of the middle burner set deposit silica soot, so that at the interface, two burners are depositing silica soot on the workpiece 654. Similarly, burner 648 of the middle burner set and burner 650 of the right burner set deposit silica soot, so that at that interface 662, two burners are depositing silica soot on the workpiece 654. Such a deposition enables the creation of a preform with generally a seamless transition between the portions of the preform formed by the depositions from each respective set of chemical burners. The result of this process is the formation of a preform with a fully usable portion A as depicted in FIG. 6B between the end-portions of the workpiece.

In an alternative configuration, four burners such as burners 602, 604, 606, and 606 of FIG. 6A may be used to produce a preform of length L, where L is equal to about $3T+d_1$, as depicted in FIG. 6B. In this configuration, the four burners travel relative to the workpiece a distance of preferably about 2T.

In the design of a deposition system, there are different issues and constraints associated with the choice of whether the workpiece is physically translated to pass in front of stationary (or nearly stationary) burners or whether the burners are translated to pass along a stationary (or nearly stationary) workpiece. In the case of physically moving burners, serious (generally surmountable but costly) issues exist relating to maintaining a consistent exhaust of heat and deposition material from the deposition chamber due to the fact that the sources of the heat and deposition material are moving within the chamber. On the other hand, physically translating the workpiece relative to stationary burners causes the anticipated size of the workpiece and the distance of its translation within the chamber to define the minimum length of the chamber itself. A longer and bigger chamber not only has a larger footprint, it is also more expensive to manufacture. Although both alternatives have tradeoffs, manufacturers typically design the deposition chamber to provide for some amount of translation of the workpiece so as to minimize exhaust and other design issues associated with having moving deposition burners. Using the burner configurations disclosed herein, the minimum length of the deposition chamber may be reduced, because the necessary translation distance of the workpiece is significantly reduced in comparison with conventional configurations, such as the configuration depicted in FIG. 5. For example, using the configuration of FIG. 5, a two-meter workpiece would have to be translated two meters in each direction to allow for the pair of burners 502 to deposit on the entire workpiece. As a result, the translation distance and length of the workpiece would effectively require a chamber having a length of no less than four meters.

In contrast, using the configuration of FIG. 6A having two pairs of deposition burners, a two-meter workpiece may only have to be translated one meter in each direction. The translation distance and length of the workpiece would effectively reduce the minimum length of the deposition chamber three meters. For the configuration of FIG. 6B, which has three pairs of deposition burners, the two-meter workpiece would require a translation of approximately one half-meter in each direction. The translation distance and length of the workpiece would effectively reduce the minimum length of the deposition chamber 2.5 meters. Conversely, given a predetermined length of a deposition chamber, the maximum lengths of the preforms that can be manufactured within it are increased by implementing the new burner configurations disclosed herein.

FIG. 7 depicts a preferred embodiment of a process 700 of performing chemical vapor deposition such as may be performed by the chemical vapor deposition system 100 illustrated in FIG. 1. Optionally, in a first step 702, a start rod is obtained. In the deposition process, a length for a start rod is set. In different runs of the vapor deposition system, start rods of various lengths, preferably between about 0.8 meters and about 4 meters, may be used. Preferably, a length of a start rod is input at an operator terminal and transmitted to a computer. The computer then communicates with components of the deposition system that have functions dependent on the start rod length. Specifically, the lathe may be programmed according the length of the start rod that is used for a particular run of the deposition process 700. When the lathe receives the length value from the computer, the torch at one end of the lathe is preferably automatically repositioned to apply heat to one end of the rod. The other torch is preferably stationary. Furthermore, the motor controlling the translation of the rod executes a traverse motion profile that reflects the entered length of the start rod.

In a next step 704, silica soot is deposited in passes along a workpiece, with each of the two, three or more sets of burners (depending on the maximum possible length of the workpiece) depositing soot on respective portions of the workpiece, including the overlap segments. The first pass of depositing silica soot preferably is performed with a high flow of fuel gas and oxygen from the chemical burner relative to the flow of $SiCl_4$. Furthermore, on this first pass the traverse speed is relatively low (e.g., one meter per minute). The resulting high heat of the soot stream and of the workpiece on this first pass hardens the initial interfacial layers between the start rod and the cladding layers that are subsequently deposited, preferably preventing interface defects and slippage of the soot over the start rod.

During the first pass and throughout a run of the deposition process 700, certain parameters are preferably fixed throughout the run. Specifically, the end torches at each end of the start rod provide a flame that preferably provides a source of heat. The end torches provide heat at the ends of the workpiece to prevent the soot from cracking and to eliminate the soot slippage over the start rod during sintering, by keeping the ends denser and tightly adhered to the handle glass. The rod should be hot enough to affix the ends of the soot to a particular point on the start rod. However, if the end burners provide too much heat, then generally the start rod bends. Furthermore, to enhance the effective deposition rate, the distance between the burners/torches and the workpiece is preferably permitted to close as the workpiece increases in diameter throughout the run. This closing of the distance between the burners/torches and the workpiece via the workpiece's natural increase in diameter typically effectively meets the need for increasing the amount of heat applied to the workpiece due to its continuously increasing size and mass. Thus, as the workpiece increases in diameter, the chemical burners preferably remain stationary.

In the deposition process, and in accordance with the embodiments discussed herein, one set of burners deposits soot on one portion of the workpiece while at the same time another set of burners deposits on another portion of the workpiece. Throughout the deposition process, the sets of burners remain generally equidistant from each other, and indeed may be affixed to the same burner block which may perform the translation of the burners relative to the workpiece. Via such a configuration where the sets of burners are relatively distant from each other, when one burner has deposited on the overlap portion, sufficient time passes before a burner of the other set deposits on that same portion. That time allows the overlap segment to cool sufficiently to facilitate a strong thermophoretic force each time deposition is performed on that segment.

Once the deposition process is completed to form an optical fiber preform, in a next step 706, the preform is sintered in a furnace and then drawn in a next step 708 into optical fiber. In a next step 710, a protective coating preferably comprised of acrylate is applied to the drawn optical fiber, which is then preferably UV-cured to harden the coating. In a final step, the protected optical fiber is generally placed into tubes that may hold 100 or more optical fibers to form an optical fiber cable that is ready for use in telecommunications applications.

While preferred embodiments of the invention have been described herein, and are further explained in the accompanying materials, many variations are possible which remain within the concept and scope of the invention. Such variations would become clear to one of ordinary skill in the art after inspection of the specification and the drawings. The invention therefore is not to be restricted except within the spirit and scope of any appended claims.

What is claimed is:

1. A deposition system for depositing silica particles onto a workpiece, the deposition system comprising:
   a first set of chemical deposition burners for depositing silica particles onto a first portion of the workpiece, the first set of chemical deposition burners having a first chemical deposition burner and second chemical deposition burner;
   a second set of chemical deposition burners for depositing silica particles onto a second portion of the workpiece, the second set having a third chemical deposition burner and a fourth chemical deposition burner;
   a lathe for holding the workpiece and for rotating the workpiece relative to the first set and the second set; and
   a computer configured to control the position of the workpiece relative to the first set and the second set;
   wherein the longest longitudinal distance between chemical deposition burners within any set is less than the shortest longitudinal distance between chemical deposition burners in different sets; and
   wherein the computer is configured to cause reciprocating longitudinal relative movement between the workpiece and the first and second sets, along alternating paths in a first longitudinal direction and along an opposing second longitudinal direction; and
   wherein, along each path:

only one of the chemical deposition burners of only one of the first and second sets traverses a first segment of the workpiece;

both of the chemical deposition burners of the only one of the first and second sets traverse a second segment of the workpiece that is adjacent the first segment; and one of the chemical deposition burners of the only one of the first and second sets, and one of the chemical deposition burners of the other of the first and second sets, traverse a third segment of the workpiece that is adjacent to the second segment.

2. The deposition system of claim 1, the first and second chemical deposition burners being spaced approximately a distance d from each other, the third and fourth chemical deposition burners being spaced approximately a distance d from each other, a mean distance, T, between the first set and the second set is greater than 3×d, and the overlap segment has width of about d.

3. The deposition system of claim 1, wherein a length of the workpiece L is greater than about 80 cm, and d is between about 80 mm and about 150 mm.

4. The deposition system of claim 3, wherein L is greater than 2×T.

5. The deposition system of claim 1, wherein the system is configured such that, during a portion of the deposition, the first, second, third, and fourth chemical deposition burners will receive chemical from a common source, and stream soot at the same rate.

6. The deposition system of claim 1, wherein the total number of chemical deposition burners is four.

7. The deposition of claim 2, wherein the deposition system is configured to cause relative longitudinal movement between the workpiece and the first and second sets of burners that reciprocates along a longitudinal distance of travel that is equal to T.

8. A deposition system for depositing silica particles onto a workpiece, the deposition system comprising:
    a first set of burners for depositing silica particles onto a first portion of the workpiece;
    a second set of burners for depositing silica particles onto a second portion of the workpiece;
    a third set of burners for depositing silica particles onto a third portion of the workpiece; and
    a lathe for holding the workpiece and for rotating the workpiece relative to the first, second and third sets of burners;
    wherein the first and second portions of the workpiece overlap each other to form a first overlap segment onto which one burner from each of the first and second sets of burners is configured to deposit silica particles,
    wherein the second and third portions of the workpiece overlap each other to form a second overlap segment onto which one burner from each of the second and third sets of burners is configured to deposit silica particles,
    wherein the longest distance between deposition burners within each set is less than the shortest distance between the burners in different sets, and
    wherein the system is configured for:
        all burners in the first set of burners to deposit silica particles along a majority of the first portion outside the first overlap segment,
        all burners in the second set of burners to deposit silica particles along the entirety of the part of the second portion outside the first and second overlap segments, and
        all burners in the third set of burners to deposit silica particles along a majority of the third portion outside the second overlap segment.

9. The deposition system of claim 8, wherein the first set of burners comprises first and second burners, the second set of burners comprises third and fourth burners, and the third set of burners comprises fifth and sixth burners, wherein the spacing between the burners in each set is approximately a distance d, wherein a mean distance, T, between the first set of burners and the second set of burners and between the second set of burners and the third set of burners is greater than 3×d, and wherein the overlap segment has width of about d.

10. The deposition system of claim 8, wherein the length of the workpiece L is greater than about 80 cm, and a distance d between the burners in each set is between about 80 mm and about 150 mm.

11. The deposition system of claim 10, wherein L is greater than 3×T.

12. The deposition system of claim 8, wherein the deposition system is configured such that, during portion of the deposition, the first, second, third, fourth, fifth and sixth burners will receive chemical from a common source, and stream soot at the workpiece the same rate.

13. The deposition of claim 8, wherein the deposition system is configured to cause relative longitudinal movement between the workpiece and the first, second, and third sets of burners that reciprocates along a longitudinal distance of travel that is equal to T.

* * * * *